INVENTORS:
Ernst Braun
Gert Braun

BY

Karl G. Ross
Attorney

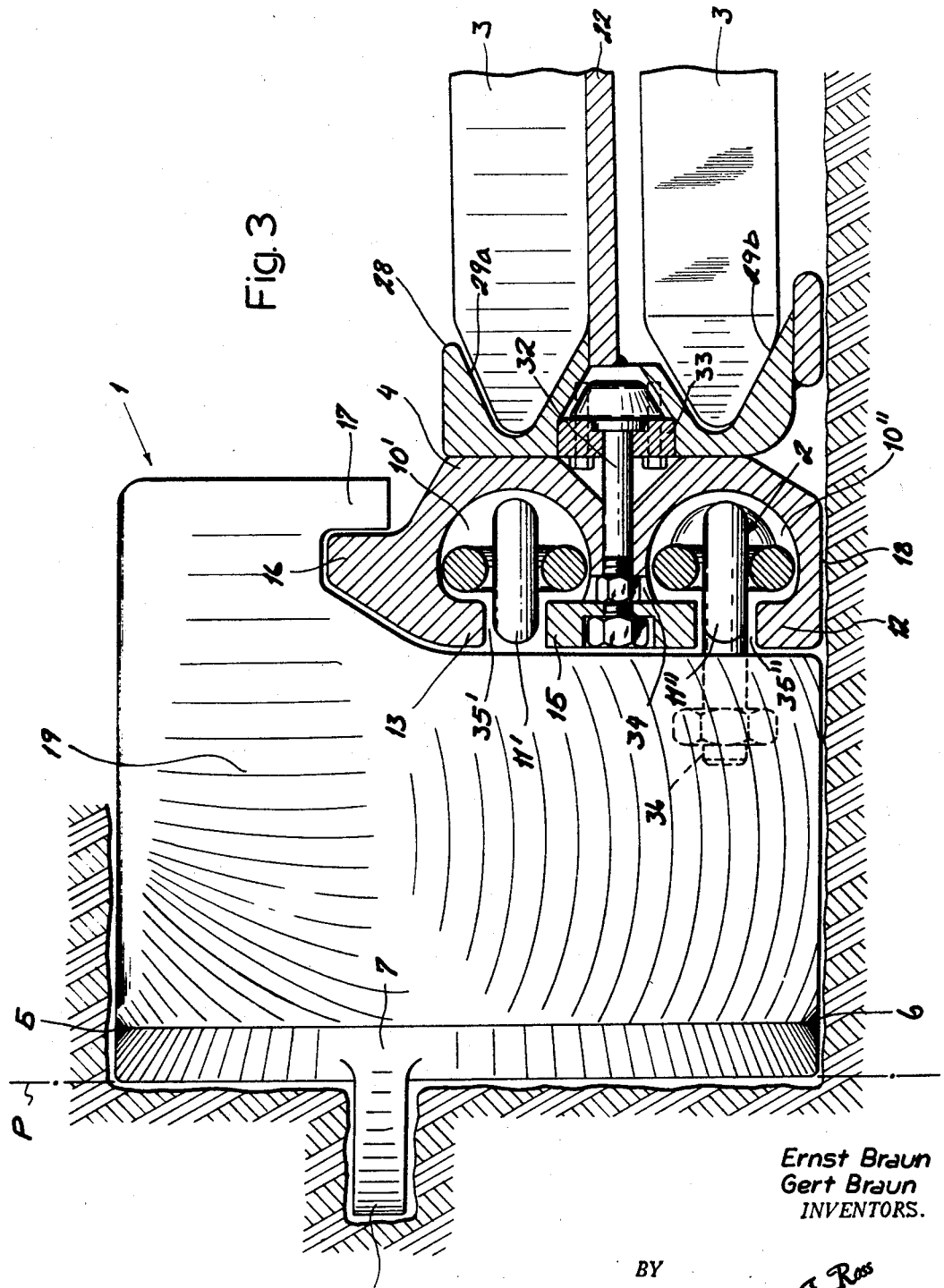

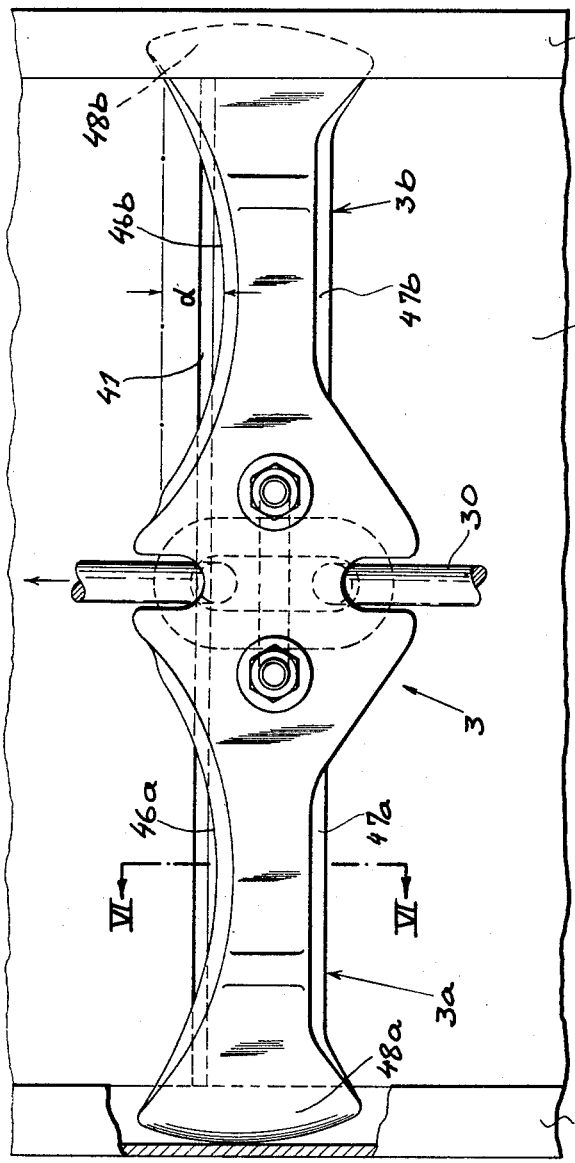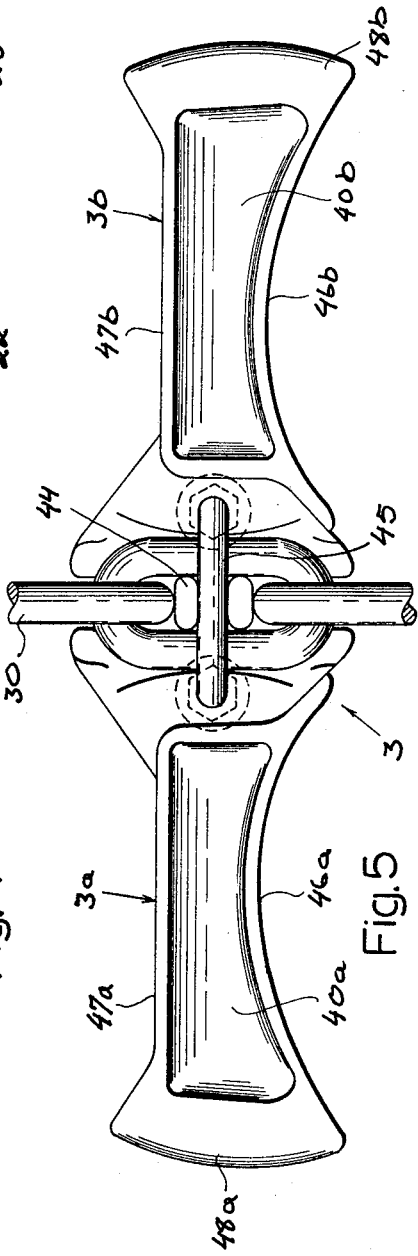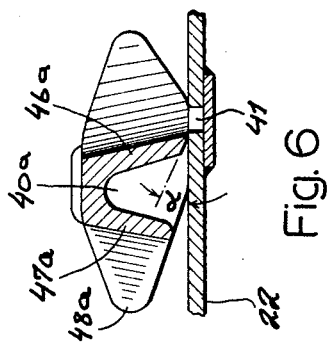

United States Patent Office 3,399,757
Patented Sept. 3, 1968

3,399,757
SCRAPING CONVEYOR
Ernst Braun and Gert Braun, Essen-Heisingen, Germany, assignors to Halbach & Braun, Maschinenfabrik Wuppertal-Barmen, Blombacherbach, Germany, a German company
Filed Mar. 27, 1967, Ser. No. 626,059
6 Claims. (Cl. 198—171)

ABSTRACT OF THE DISCLOSURE

Scraping conveyor for mine excavator, with a series of flights longitudinally spaced on a centrally positioned single chain or on a pair of transversely spaced outer chains for movement in a closed path along the upper and lower surfaces of an apron to entrain mineral lumps deposited thereon. Each flight is of inverted U-profile, with a forwardly concave leading edge scraping the apron while traveling along the upper run of the chain or chains, the depth of curvature being sufficient for overriding transverse gaps between adjoining apron sections; the corresponding trailing edge is foreshortened to stand clear of the apron surface. In the specific case of a single-chain conveyor, each flight half on either side of the central chain has a concave forward edge and a free end guided in an endless track of a lateral rib bounding the apron to form a trough.

---

Our present invention relates to a scraping conveyor of the type used in mining operations, generally as part of an excavator having cutting tools for detaching lumps of coal or other minerals from surrounding rock and depositing them on an apron of the conveyor in the path of a series of longitudinally spaced flights which are carried on one or more flexible driving elements, such as chains, looped around the trough.

The conveyor flights, which scrape the surface of the apron while passing along the upper run of the associated driving chain or chains, should be capable of gathering up larger and smaller chunks of coal or the like without permitting any particles to become wedged between the underside of a flight and the apron. Since the apron usually is composed of several sections forming transverse gaps at their junctions, it is also necessary that the flights should be able to pass smoothly over these gaps. The first requirement dictates the use of narrow leading edges on the conveyor flights, yet such edges tend to drop into the gaps between the apron sections unless reinforced by rearwardly extending cross-ribs which rest on the trough surface and are therefore prone to accumulate mineral particles between themselves and the apron.

The general object of our present invention, therefore, is to provide an improved type of flight conveyor which avoids these difficulties.

In a conveyor according to the invention, each flight has a concave leading edge facing in the forward direction of motion with a depth of curvature greater than the width of the gaps between adjoining apron sections. This curvature may be defined by a single arc, particularly if the flights are attached at their ends only to a pair of parallel driving chains; in a preferred embodiment, the flights are secured at their centers to a single chain or driving element, each half of a flight lying on either side of the driving element, has its own concave leading edge with the vertex of its curvature disposed substantially midway between the driving element and the outer end of the respective flight half.

According to a more specific feature of our invention, each conveyor flight or each of its halves has a through-going bottom recess extending over the major part of its length and defining a profile of inverted-U shape (when viewed in the operating position of the flight, i.e. on the upper run of its driving chain or chains). The forward leg of the U, constituting the concave leading edge, contacts the apron surface while the rear leg is somewhat foreshortened to stand clear of that surface during the scraping operation. Thus, the flights are mechanically strong but the possibility of particle accumulation between their undersides and the apron is minimized. At the same time, the curvature of their leading edges tends to concentrate the swept-up mineral chunks at the center of the flight, or of each flight half, and prevents them from migrating outwardly toward the lateral conveyor edges.

Our invention will be described in greater detail with reference to the accompanying drawing in which:

FIG. 1 is a side-elevational view (parts broken away) of a mine excavator provided with a flight conveyor according to our invention, the excavator also including features separately claimed in our concurrently filed patent applications Ser. No. 626,061 for "Mine Excavator" and Ser. No. 626,060 for "Coal-Cutting Tool";

FIG. 3 is a cross-sectional view taken on the line III—III of FIG. 2;

FIG. 4 is a top view of one of the flights of the conveyor;

FIG. 5 is a bottom view of the flight shown in FIG. 4; and

FIG. 6 is a cross-sectional view taken on the line VI—VI of FIG. 4.

Figure 1:
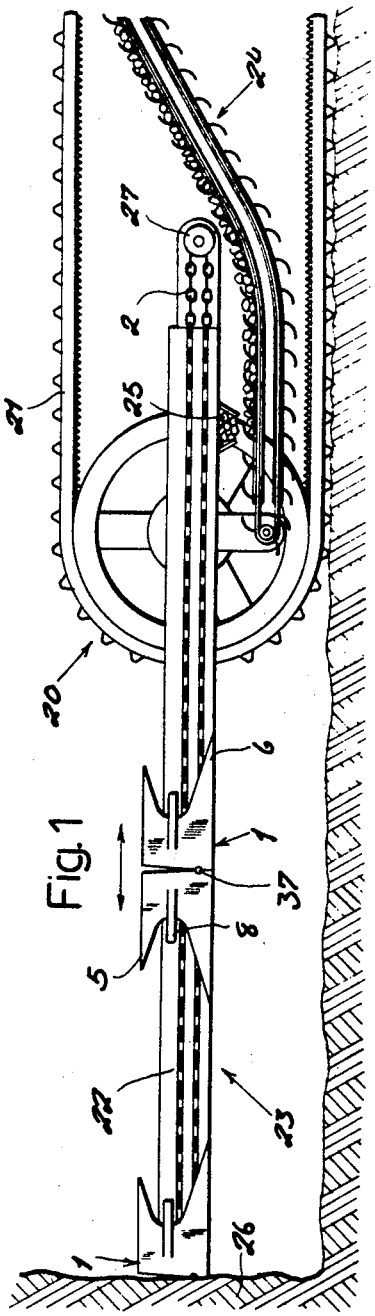
Figure 2:
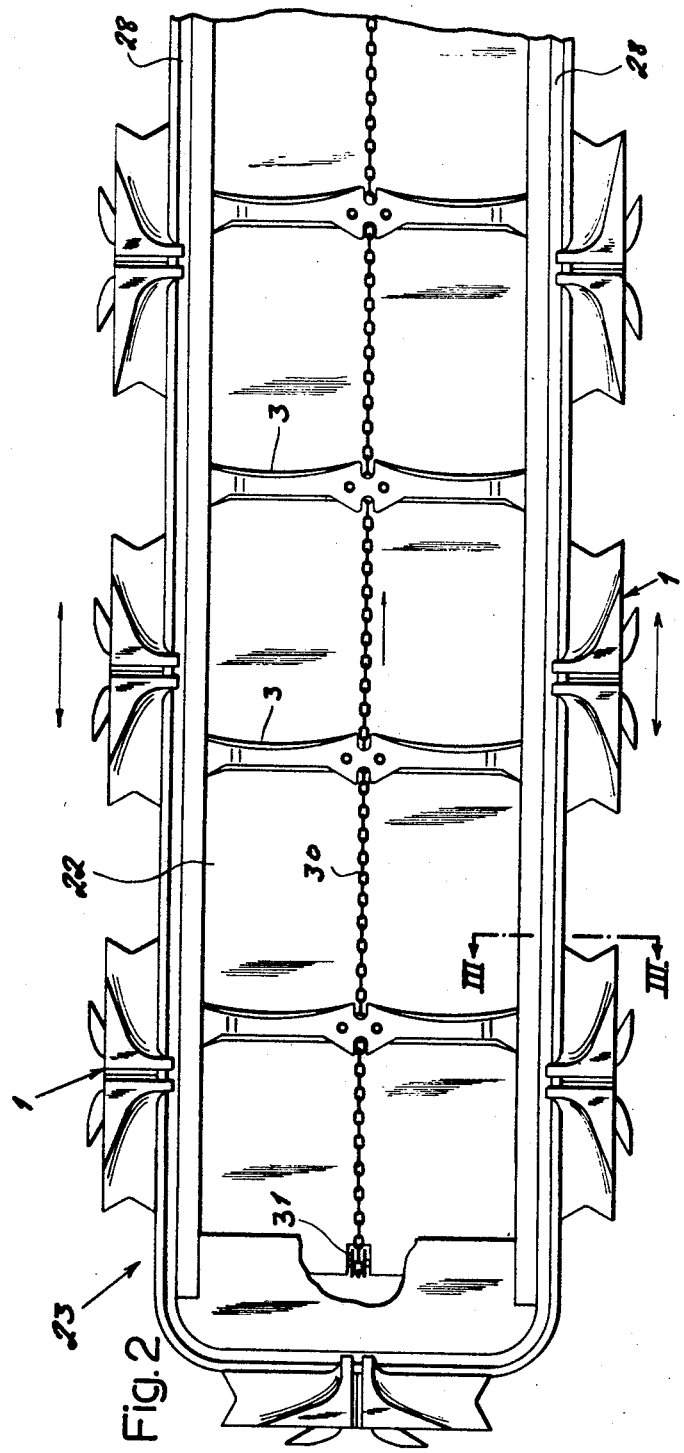
FIG. 2 is a top view of a major part of the flight conveyor forming part of the excavator of FIG. 1.

Reference will first be made to FIGS. 1–3 for a description of a mine excavator of which the present improvement forms a part.

The mine excavator shown in the drawing comprises a self-propelled vehicle 20, equipped with caterpillar tracks 21, on which there is mounted a supporting platform or apron 22 for a cutting unit generally designated 23 and a transport unit 24 in the form of a bucket-type conveyor designed to receive chunks of coal 25 from unit 23 for delivery to a repository not shown. Cutting unit 23, which digs into the coal-bearing rock 26, comprises a set of cutting tools 1 reciprocatingly driven along the edges of platform 22 by a motor (not shown) operating a sprocket 27 in engagement with an endless chain 2 to which the tools 1 are secured. Platform 22 is laterally bounded by ribs 28 which define with this platform a conveyor trough and form an endless guide track for the extremities of a series of flights 3 on a central conveyor chain 30 driven unidirectionally by a motor (not shown) on vehicle 20; the guide track has an upper run 29a and a lower run 29b respectively located above and below platform 22. The endless driving chain 30 is longitudinally looped around platform 22 by way of a pair of sprockets of which one has been shown at 31 (FIG. 2). This chain, like the reciprocating chain 2 passing along the forward and lateral edges of trough 22, 28 is therefore also divided into an upper and a lower run.

The cutting tools 1, which are designed to throw loose chunks of coal onto the upper surface of conveyor apron 22, ride on a rail 4 which bounds the conveyor trough on three sides and adjoins its ribs 28 to which it is secured with the aid of a series of bolts 32 that are anchored to inserts 33 rigid with these ribs. Rail 4 is a profiled bar whose cross-section is generally in the shape of a W laid on its side so as to form an upper and a lower channel 10', 10" respectively accommodating the upper and lower runs of chain 2; these channels are laterally open but are partly obstructed by projecting lips of the lower and upper flanges 12, 13 of the W-profile as well as by a flat strip 15 which is detachably secured, for purposes of assembly and disassembly, to the central web 34 of the profile separating the channels 10′ and 10″. Strip 15 and flanges 12, 13 thus define two horizontal slots 35′, 35″ for the guidance of alternate, i.e. horizontal, links 11′, 11″ of the chain 2; a bolt 36, rigid with one of the links 11″, removably secures the body 19 of each tool 1 to the lower run of this chain. Tool body 19, whose lower surface is substantially flush with the underside 18 of flange 12, is divided into two symmetrical halves hingedly interconnected at 37 (FIG. 1) for limited swinging about their respective mounting bolts 36; each half forms a seating surface straddling a ridge 16 integral with flange 13 and terminating in a lug 17 which reaches around this flange to provide added support for the tool.

Each half of tool body 19 is formed with a set of cutting knives including a chisel-shaped lower ramp knife 6, a somewhat shorter upper ramp knife 5 and a still shorter ripping knife 8 located substantially on the level of upper flange 13 of rail 4. During each reciprocating stroke of chain 2, only one set of knives is effective to cut coal and to plane the seam which the unit 23 is following in the rock 26. The trailing, ineffectual set of knives may rock slightly about its pivot 37 to reduce the drag of the lower ramp knife 6. The operating knives 5 and 6 have outer boundaries which lie in a common vertical plane P and diverge in a forward direction of their effective stroke, within that plane, at an angle approximately bisected by the ripping knife 8, the latter projecting forwardly and outwardly beyond plane P. All three knives are integrally joined together at a throat 7 which is flared laterally (to the right in FIG. 3) so as to discharge oncoming pieces of rock and coal, ascending the ramp of knife 6, onto the apron 22 of the flight conveyor for entrainment by the elements 3 thereof. During each planing stroke, the working knife 6 tends to dig into the underlying coal layer to the extent permitted by the swingable suspension of the corresponding body half.

Reference will now be made to FIGS. 4–6 for a more detailed description of the conveyor flights 3. Each of these flights is secured at its center, with the aid of a strap 45 (FIG. 5), to a link of driving chain 30 so as to form two symmetrical arms 3a, 3b on opposite sides of this chain; spacers 44 insure a firm connection between the chain and its flights. Each half 3a, 3b has a forwardly concave leading edge 46a, 46b formed as an arm of a profile of inverted-U shape as best seen in FIG. 6; the other arm 47a, 47b of this profile is foreshortened so as to be spaced from the surface of plate 22 when the latter is scraped by edge 46a, 46b. This profile defines a throughgoing recess 40a, 40b which is free from any transverse reinforcements (parallel to the direction of conveyor motion) and extends from the vicinity of chain 30 to the respective extremities 48a, 48b guided in the associated rib 28 of the conveyor trough.

As shown in FIGS. 4 and 6, platform 22 consists of longitudinally adjoining sections which are separated by transverse gaps 41. The depth $d$ of the concavity of each edge 46a, 46b is considerably greater than the width of the gap 41 so that the flights 3 readily override these gaps and at no point tend to sink into these gaps. The rake angle $\alpha$ at the underside of the scraping edge insures that any small particle becoming lodged in one of the gaps 41 and projecting therefrom is immediately shaved off by the oncoming flight. Thus the conveyor operates smoothly and without objectionable canting or torsional stress upon its driving chain 30.

The construction of the tools 1 and the guide rails 4 thereof, disclosed but not claimed herein, is the subject matter of claims of our copending applications of even date identified above.

We claim:
1. In a mine excavator having an apron composed of longitudinally adjoining sections separated by transverse gaps, the combination therewith of a conveyor comprising at least one endless flexible driving element looped around said apron with an upper and a lower run passing longitudinally above and below said trough, respectively; a series of transverse flights secured at longitudinally spaced locations to said element for scraping the upper surface of said apron while moving along said upper run; and drive means for unidirectionally advancing said drive element together with said flights, each of said flights having a concave leading edge facing in the forward direction of motion with a depth of curvature greater than the width of said gaps and normally in contact with the upper surface of said apron.

2. The combination defined in claim 1 wherein said flights are of inverted U-profile with a forward leg forming said concave leading edge, said forward leg contacting said trough along said upper run.

3. The combination defined in claim 2 wherein said inverted U-profile has a foreshortened rear leg spaced from said apron along said upper run.

4. The combination defined in claim 3 wherein each of said flights has two halves extending symmetrically on opposite sides of said driving element, each of said halves having its own concave leading edge with the vertex of its curvature disposed substantially midway between said driving element and the outer end of the respective half.

5. The combination defined in claim 4 wherein said apron is part of a trough provided with lateral ribs forming a pair of endless guide tracks for the outer ends of said flights.

6. The combination defined in claim 4 wherein the profile of each half defines a throughgoing bottom recess extending over the greater part of the length of said half.

References Cited

UNITED STATES PATENTS

| 1,013,794 | 1/1912 | Martin | 198—176 |
| 1,699,187 | 1/1929 | Graff | 198—171 X |

FOREIGN PATENTS

| 688,748 | 3/1953 | Great Britain. |

OTHER REFERENCES

German printed application (Rösler) 1,217,863, May 1966.

EVON C. BLUNK, *Primary Examiner.*

R. J. HICKEY, *Assistant Examiner.*